July 25, 1961 K. WINZ 2,993,584
CONVEYOR ARRANGEMENT PARTICULARLY FOR TEXTILE PLANTS
Filed March 24, 1959 4 Sheets-Sheet 1

INVENTOR
Karl WINZ
BY Robert H. Jacot.
AGT.

July 25, 1961 K. WINZ 2,993,584
CONVEYOR ARRANGEMENT PARTICULARLY FOR TEXTILE PLANTS
Filed March 24, 1959 4 Sheets-Sheet 2

INVENTOR
Karl WINZ

BY Robert K Jacob
AGT.

INVENTOR
Karl WINZ

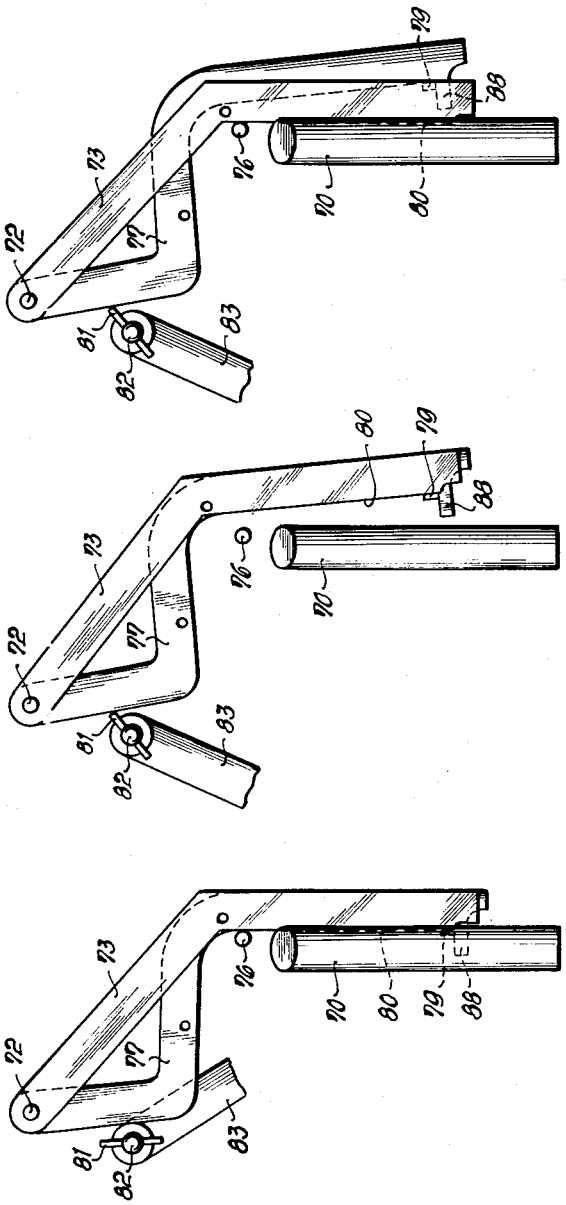

United States Patent Office 2,993,584
Patented July 25, 1961

2,993,584
CONVEYOR ARRANGEMENT PARTICULARLY FOR TEXTILE PLANTS
Karl Winz, Kaiserslautern, Pfalz, Germany, assignor to G.M. Pfaff A.G., Kaiserslautern, Pfalz, Germany
Filed Mar. 24, 1959, Ser. No. 801,597
Claims priority, application Germany Mar. 25, 1958
2 Claims. (Cl. 198—38)

The present invention relates to conveyor installations. More particularly the invention relates to a conveyor plant of the type having carriers for the material to be conveyed which are brought into motion by means of circulating catchers on an endless chain. In this arrangement the carriers for the material to be conveyed are automatically released as determined by a means for selecting a predetermined station which is continuously connected with them and are switched out of the path of circulation. They are then returned to circulation from a loading position to catchers arriving in unoccupied condition by means of a slide release which frees individual carriers automatically.

The carriers for the material must be adapted to be hooked onto the catchers which are provided with carrier hooks.

It is an object of the invention to provide a possibility for storing a plurality of material carriers, particularly for suits, overcoats or the like at a loading position and automatically transfer one of the stored material carriers, which is especially advantageous in connection with relatively short but wide material carriers such as clothes hangers for the above mentioned clothes, which, moreover, are lined up at short, but also at varying distances from one another when the articles hung onto them do not permit of maintaining equal distances.

In endless conveyors of the aforementioned type having inclined conveyor shells abutments are already known of which one may be retracted and the other in operative position, in order to prevent that a second conveyor shell starts to move toward a shell which is to be switched in. This known delaying or detent arrangement is suitable only for relatively large minimum distances between the carriers for the material to be conveyed, for example for carrier shells which follow one another without a gap therebetween and requires that all material carriers to be switched in out of a series of material carriers which are to be connected eventually are of equal length.

It is therefore, a further object of the invention that stationary rails or bars which are inclined with respect to the endless conveyor path for the carrier hooks which bars are arranged for suspending the material carriers at their lower ends are provided with a discharge detent which is releasable by catchers, and which is restored to locking position by the sliding release movement of the material carrier which is being released and separated therefrom.

In such an embodiment of the invention it is possible to realize a particularly simple and cheap manner of construction in that a stop lever for the carriers of the conveyed material, which lever is retained in its position by a resetting spring, is disposed above each rail in the operating range of a lug of a release lever arranged behind it in relation to the direction of discharge. The release lever is shiftable by an empty arriving catch against the force of the resetting springs in a direction parallel to the stop lever, on the same pivot, and is also adapted to be shifted perpendicularly thereto and extends somewhat further into the discharge path of the material carriers than the stop lever, so that it is seized by a material carrier released by the stop lever and its lug is disengaged from the stop lever.

Further advantages and details of the invention will become apparent if reference is had to the following description of the drawings which illustrate one embodiment of the invention and in which:

FIGS. 5, 6, and 7 indicate subsequent phases of a discharge latch of a slide catch of a loading station.

Figure 2:
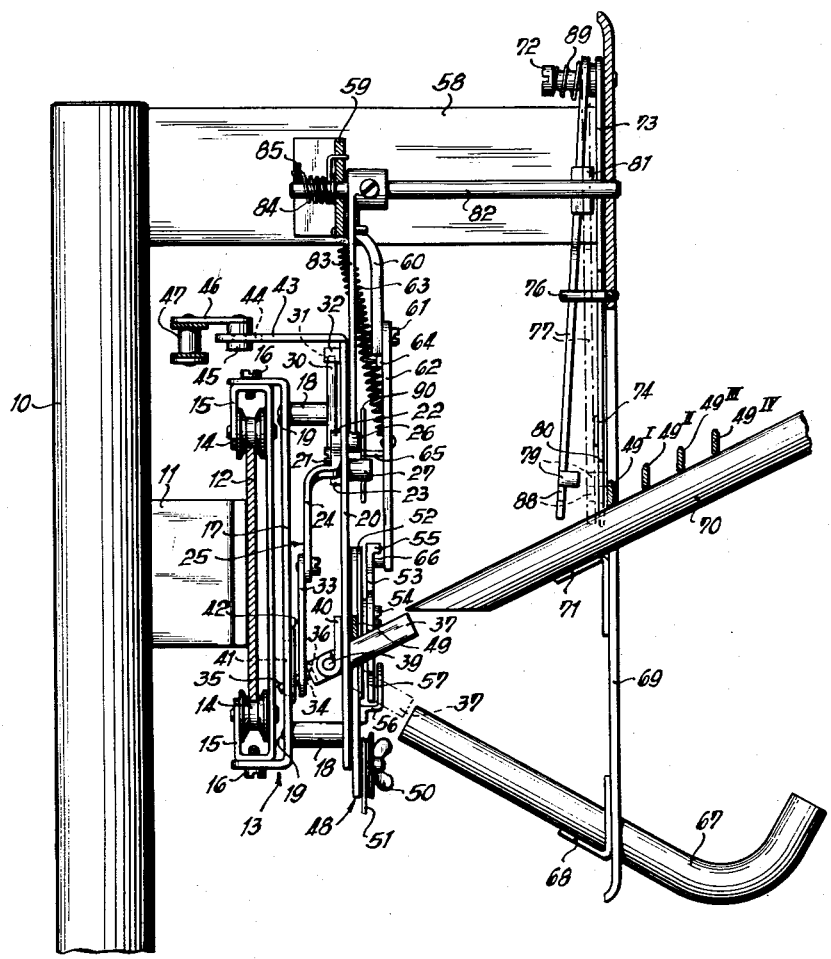
FIG. 2 is a section along line II—II of FIG. 1.

The conveyor arrangement is carried by a frame of which a part of a tubular support 10 is illustrated in FIG. 2. Carrier arms 11 are connected with the tubular supports 10 in a suitable manner, for example, by welding to which in turn a strap iron is connected which constitutes an endless runner or rail 12.

The rail 12 is provided with catchers 13 which are movable thereon by means of rollers 14. To make it possible for the catchers 13 to run also over curved stretches of the carrier rail 12, two pairs of rollers 14 disposed above one another are journalled upon a turnable frame 15 (FIG. 2) which in turn is rotatably secured to the catcher 13, particularly to a base plate 17 thereon, by means of bolts 16. A supporting plate 20 is rigidly secured to the base plate 17 by means of three screws 19 which are provided with spacing sleeves 18'.

A lever 25 comprising three arms, 22, 23, and 24, is rotatably journalled upon the base plate 20 by means of a collar screw 21. Each of the arms 22 and 23 carries at its end a stud 26, 27 respectively. These studs project through respective arcuate slots 28 and 29 in the base plate 20. A leaf spring 30 is soldered to the lever 25, the free end of which is supported against a notch 31 of a boss 32 secured to the base plate 20. The leaf spring 30 acts as a tilting spring and tends to retain the lever 25 in any one of two given extreme positions to which it is adjusted and which are determined by the abutment of the studs 26 and 27 against the ends of the slots 28 and 29 respectively. The spring 30 thus acts upon lever 25 in a counterclockwise direction as indicated in FIG. 3 and in a clockwise direction as indicated in FIG. 4.

A draw bar 33 is linked to arm 24 which at its lower end is provided with an eye 34. The latter encompasses a pin 35 which is seated in a strap 36 which in turn is bent up at both ends to form carrier arms 37. These extend through slots 38 in the base plate 20 and carry lateral studs 39 for pivotal support in the bearing straps 40 (FIG. 2). The base plate 17 is provided with a vertical slot 41 for guiding the pin 35, as well as with a raised portion 42 in the proximity of this slot so that the draw bar 33 is guided with little tolerance between the strap 36 and the raised portion 42.

Figure 3:
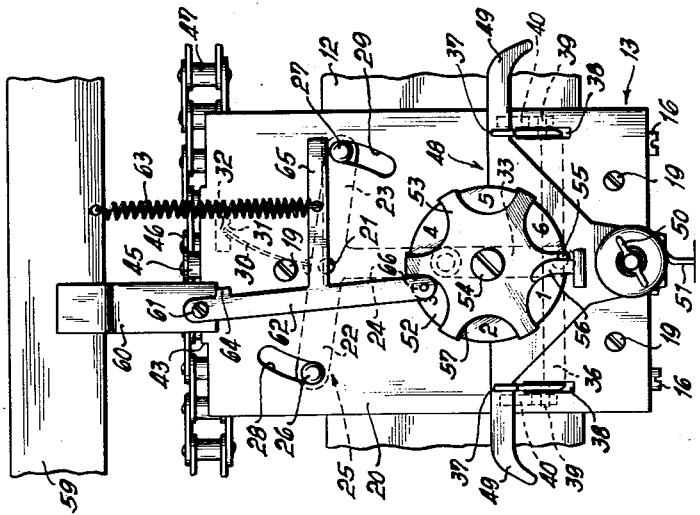
FIGS. 3 and 4 are front views of a discharge station illustrating two subsequent phases of the release of a material carrier.
Figure 4:
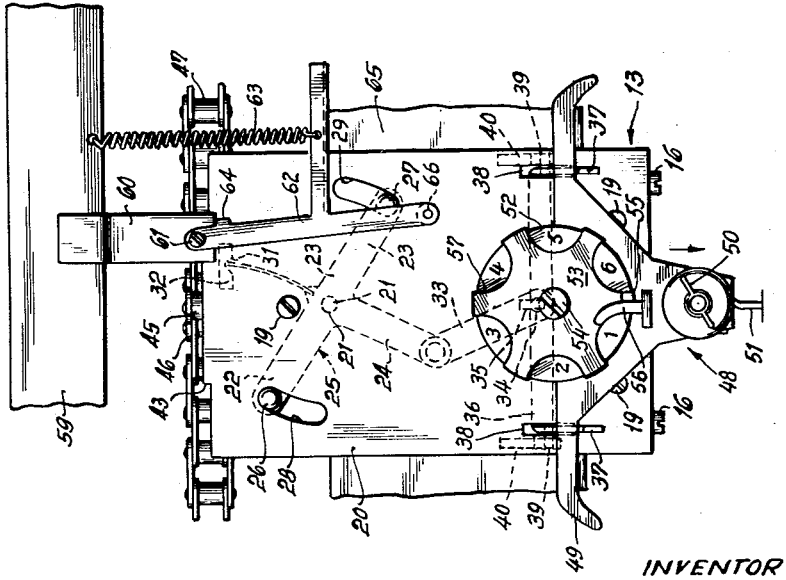

The connection of lever 25 by way of draw bar 33 to the pivotally supported strap 36 provided with the carrier arms 37 effects that as the lever 25 is tilted from the position shown in FIG. 3 to the position in accordance with FIG. 4, the carrier arms 37 are turned from the position shown in FIG. 2 in full lines downwardly into the position indicated in dot and dash lines. Inversely, tilting of lever 25 from the position in accordance with FIG. 4 to the position in accordance with FIG. 3 effects the restoring of the carrier arms 37 to the position shown in full lines in FIG. 2. The carrier arms 37 are suitable in erected position to receive relatively heavy downwardly directed loads because of the collapsible lever joint is then in stretched out position (FIG. 3).

Figure 1:
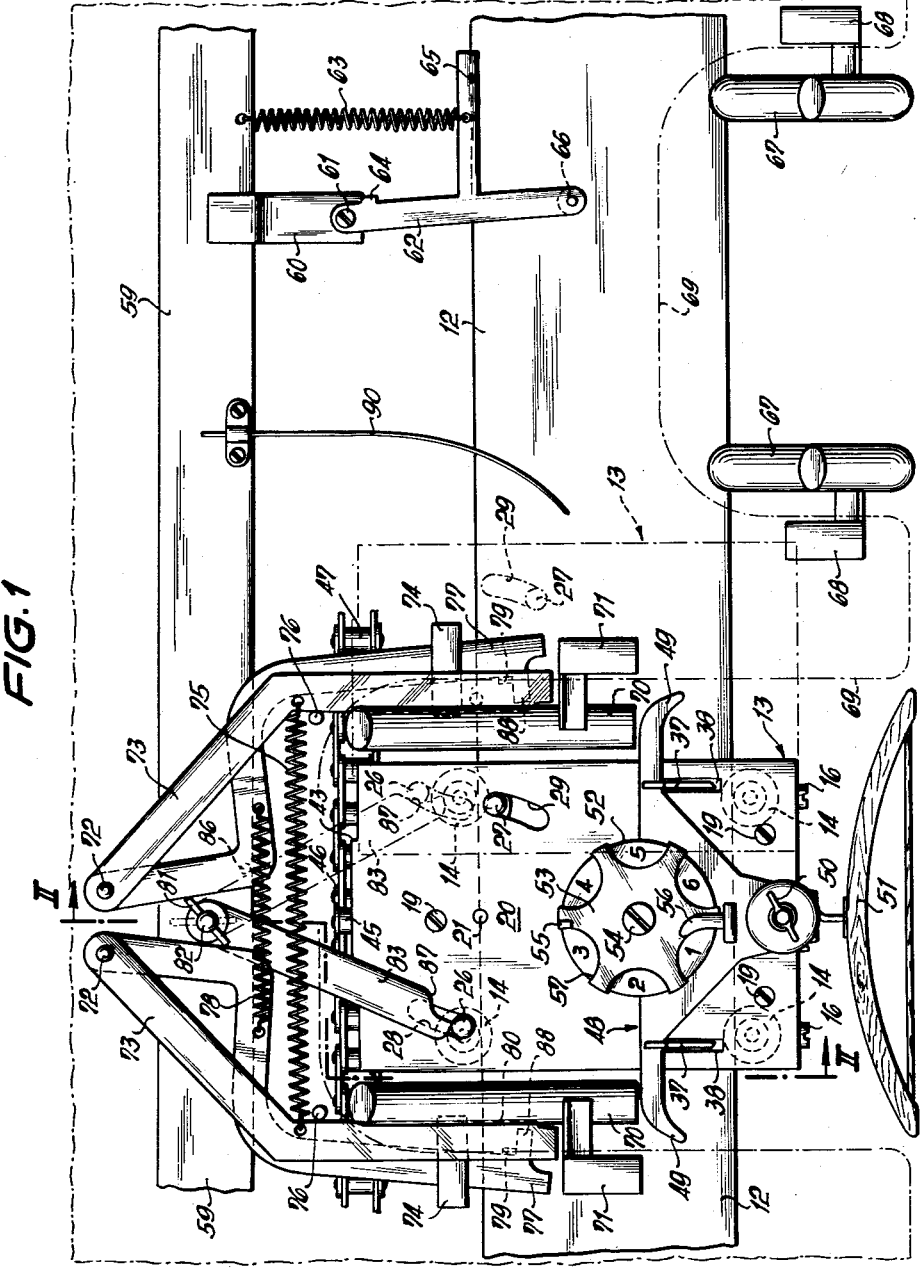
FIG. 1 shows as a partial view a receiving and discharging station of a conveyor arrangement from the front where the cover plate is merely indicated in interrupted lines.

At its upper end the base plate 20 carries a rearwardly bent projection or lug 43 which presents an open slot 44 (FIG. 2). A bolt 45 extends through slot 44 and in this manner connects the catcher 13 which comprises elements 14 to 44 and which is movable on the endless rail 12 by way of a connecting plate 46 to an endless chain 47 which in a manner known per se is guided on the frame of the conveying plate moving continuously, in this instance from the right to the left as seen in FIGS. 1, 3 and 4. Accordingly, several catchers 13 connected with the chain 47 move around upon the endless rail 12 at distances from each other which remain constant.

The catchers 13 are adapted by virtue of their carrier arms 37 to support material carriers 48 as seen in FIGS. 1–3. Each of the material carriers 48 have two arms 49 with which they rest upon the carrier arms 37 and have also secured to their lower ends by means of a wing nut 50 a conventional clothes hanger 51 adapted to receive goods or material such as suits, overcoats or the like, which are to be worked on at the working stations along the conveying plant.

A selector disk 53 is mounted for rotatable movement about a screw 54 over a circular scale 52 of the material carrier 48 which scale is provided with numerals 1–6 and which disk has a turned up lug 55 as an abutment which cooperates with a stop member 56. Arcuate cut-outs 57 in the selector disk permit the numerals 1–6 to be seen. The last mentioned parts 52—57 constitute a location selector arrangement for the material carrier 48 which is constituted of elements 49—57. The mode of operation of this selector arrangement will be described later.

One material carrier 48 the selector 53 of which assumes the position indicated in FIGS. 3 and 4 where its nose or lug 55 rests against the right side of stop member 56 is automatically released from the catcher 13 by the arrangement described hereinafter.

Tubular supports 10 are provided with carrier arms 58 (FIG. 2) and, in turn support rails 59 are connected thereto. Secured to support rails 59 are downwardly extending arms 60 which are somewhat forwardly bent as shown in FIG. 2. A screw 61 rotatably supports a release lever 62 having a projecting lug 64 which is pulled against an abutment on the arm 60 with which it is associated by means of a spring 63. The release lever 62 has a laterally extending presser arm 65 with a rearwardly bent angular portion and a running roller 66 which extends into the operating path of the selector disks 53 of material carriers 48 hung onto the carrier arms 37 as shown in FIGS. 2 and 3.

If a catcher 13 with a material carrier 48 the selector disk of which is set with its lug 55 immediately at the right side of the stop member 56 runs from the right against a release lever 62 as indicated in FIG. 3, the lug 55 and stop member 56 prevent clockwise movement of selector disk 53 when roller 66 engages the cut-out 57. As a result of the continuing movement of catcher 13 on the conveyor carrier 48 to the left the selector disk 53 in its turn forces the release lever 62 to the left against the force of spring 63. The presser arm 65 consequently moves downwardly and thereby presses the stud 27 downwardly until spring 30 flips over, swinging lever 25 clockwise as far as the arcuate slots 28 and 29 will permit. As a result of the shifting of lever 25 from the position of FIG. 3 to the position of FIG. 4 the carrier arms 37 are turned downwardly so that the entire material carrier 48 slides downwardly in the direction of the arrow (FIG. 4), whereupon release lever 62 returns to its initial position under the pressure of spring 63.

The release of the material carrier 48 described above takes place at the moment when its arms 49 are directly behind two catcher bars 67 of the discharge station which are supported by angular members 68, which, in turn are secured to the cover plate 69 (FIG. 2) which in FIG. 1 is merely indicated in dot and dash lines and, which is supported by the supporting arms 58.

However, if the lug 55 of disk 53 of a material carrier 48 which arrives from the right is not immediately adjacent the right side of the stop member 56, the roller 66 remains stationary by virtue of the spring 63, so that as a result of the continuing movement of the material carrier 48 to the left, the selector disk 53 is turned clockwise through an angle corresponding to the angular distance between corresponding points of two adjacent cut-outs 57. On passing through each release position having a release lever 62 the selector disk is therefore turned one step in clockwise direction until further rotation is prevented by engagement of lug 55 with the stop member 56. Thereupon the material carrier 48 is cast off as explained above and is received by the catcher bars 67.

As a result of the construction thus far described it can be determined even before the transfer of a material carrier 48 to an unoccupied catcher 13, to be described later, at which of the discharge stations following a loading station along the path of circulation the material carrier 48 is to be released from the catcher 13. For this purpose it is merely necessary to rotate the selector disk 53 counterclockwise from the initial position of contact of lug 55 proximate stop member 56, by as many steps as the number of discharge stations through which a carrier must pass between the loading station and the actual destinated discharge station.

The circular scale 52 having numerals 1–6 provides a facility in the setting of the selector disk 53. For example, if the fourth discharge station behind the loading station is to be set up, the operator merely needs to place the index finger into that cut-out 57 of the selector disk 53, and which is turned all the way to the right, where the numeral 4 appears and rotate the disk counterclockwise until the index finger contacts the stop member 56. In the illustrative example the selector 53 has been moved three steps and the lug 55 is in the position shown in FIG. 1. The material carrier thus adjusted or set will then pass through three discharge stations while turning back the disk 53 a step each time and in the fourth station it is released by the catcher 13 in the manner described. In this manner the station selecting device which comprises the parts 52—57 remains continuously with the material carrier 48, is shifted together with it out of the conveyor circuit and is suitable when thus removed from the circuit for effecting a new station selection.

The automatic transfer of one single material carrier 48 to a catcher 13 arriving in unoccupied condition is effected by the arrangement described hereinafter.

At the cover plate 69 which is provided with entrance cut-outs at the loading station in order to provide a possibility for passing through the material carriers 48 as indicated on the left side of FIG. 1 bars 70 are secured by means of angular members 71 inclined with respect to the conveyor track for the carrier hooks 37. Upon the reverse side of the cover plate 69 a pair of locking levers 73 are pivotally mounted on a pair of screws 72 at each of the loading stations and are brought out through a pair of guide plates 74 secured to the cover plate 69 in a plane parallel to the cover plate 69. The two locking levers 73 are pulled by means of a spring 75 (FIG. 1) against an abutment stud 76 of the cover plate 69. In this position they extend toward the bars 70 so far that arms 49′, 49″, 49‴, and 49$^{IV}$ (FIG. 2) retain material carriers (not shown) lined up upon the bars 70.

Also a pair of release levers 77 are pivotally mounted upon screws 72 which are likewise drawn up by a spring 78 (FIG. 1) against the abutment studs 76. In this position a lug 79 which is turned up from the release levers 77 rests against the inner edges 80 of the locking levers 73 as shown in FIG. 5 and as indicated in FIG. 2 in dot and dash lines.

In order to shift the release lever 77 against the force of the spring 78 and subsequently to lock the locking levers 73 by way of lugs 79 a protrusion 81 is provided which is set into an operating shaft 82 which is journalled in the carrier bar 59 and in the cover plate 69 and is rigidly connected with an operating arm 83. A helical spring 84 (FIG. 2) which is anchored in a bore rearwardly of the carrier bar 59 acts upon the operating shaft 82 in a counterclockwise direction by way of a pin 85 as shown in FIGS. 1, 5, 6 and 7 in a manner that the operating arm 83 rests against an abutment pin 86 (FIGS. 1 and 2). This position of the operating arm 83 is indicated in dot and dash lines in FIG. 1.

The release of the lowermost of a series of material carriers from the bars 70 by means of a catcher 13 arriving in unoccupied condition is explained hereinafter.

In an unoccupied catcher 13 the carrier hooks 37 are turned downwardly as a result of the last discharge operation, the lever 25 is moved to the left to assume the position in accordance with FIG. 4 where the carrier 48 has been released and lever 62 has already returned to its initial position. An unoccupied arriving catcher 13 having this position of the lever 25 and therefore of the studs 26, 27 is shown in dotted lines in FIG. 1. The stud 26 engages a recess 87 of the operating arm 83. During the further course of the movement the operating arm 83 is shifted to the left (as seen in FIG. 1). The recess 87 forces the stud 26 downwardly so that finally the lever 25 under cooperation of the leaf spring 30 flips into that position where the stud 26 rests at the lower end of the slot 28. In this manner the carrier hooks 37 are raised up so that they are ready to receive one of the material carriers 48 as described hereinabove.

The stud 26 during its further movement toward the left now shifts the operating arm 83 so far that its protrusion 81 presses apart the two release levers 77. This phase is illustrated in FIG. 6. At the same time the lugs 79 carry along the locking levers 73 as a result of engagement at the inner edges 80, whereupon the locking levers 73 release the arms 49 of the lowermost of the material carriers 48 lined up upon the bars 70 and the carrier is guided downwardly upon the bars 70.

Extensions 88 of the release levers 77 however extend somewhat further into the discharge track of the arms 49 than the locking levers 73 as shown in FIG. 6. As a consequence the release levers 77 are disengaged by the released material carrier 48 and shifted into the position shown in full lines in FIG. 2 against the force of the springs 89 arranged upon the screws 72. The lugs 79 thereby are disengaged from the locking levers 73 so that they are immediately pulled against the abutment stud 76 by the force of the spring 75 as indicated in FIGS. 1 and 7.

A discharging material carrier thus shifts the slide lock which is constituted by locking levers 73 back into locking position so that only a single one of an entire series of material carriers the arms 49' to 49$^{IV}$ of which are held at a distance by the material suspended thereon is transferred to an unoccupied catcher 13. In FIG. 1 the material carrier 48 is already received by the carrier hooks 37.

Upon the complete passing of the stud 26 along the operating arm 83 the latter returns to the starting position under the effect of the helical spring 48, whereby the release levers 77 return to the position in accordance with FIG. 5, while the lugs 79 again come to rest at the inner edges 80 under the pressure of helical springs 89.

If, on the other hand, an occupied catcher 13 approaches a loading station, it passes through without any effect because with the raised carrier hooks 37 the stud 26 is so low that it passes below the operating arm 83 indicated in dot and dash lines in FIG. 1.

In the event that the bars 70 of a loading station do not present any material, the lever 25 of an unoccupied catcher 13 is nevertheless shifted by the operating arm 83 in such a manner that the stud 26 assumes its lowermost end position. In this manner an "occupied" condition would be simulated and further material carriers could not longer be taken over automatically by this catcher 13. To prevent this, a release spring 90 (FIG. 1) is provided on the carrier track 59 in the direction of circulation ahead of each loading station in connection with which only the lower end is illustrated in FIG. 2. The release spring 90 extends into the range of movement of the stud 27 and is so proportioned as to strength that it can press the stud 27 downwardly as it passes when the carrier hook is not loaded, but if the carrier hook 37 is loaded as a result of the increased internal friction of the shifting lever system 24—33, the spring pressure is insufficient to interrupt this. The release spring 90 thus insures that the stud 26 of a catcher 13 arriving at the loading station is in its uppermost end position.

Having now described my invention with reference to the embodiment illustrated in the drawings, I do not wish to be limited thereto but what I desire to protect by Letters Patent is set forth in the appended claims.

I claim:

1. In a conveyor arrangement provided with material carriers adapted to circulate on carrier hooks provided on catchers mounted on an endless chain, each of said material carriers having associated therewith a station selecting means operative by way of pivotable release levers to actuate mechanism on said catchers to automatically release the material carriers and shift them out of circulation, and to automatically transfer said material carriers from a loading station to vacant arriving catchers by way of a slide lock adapted to release individual material carriers; operating means comprising stationary bars for supporting material carriers in alignment and inclined in the direction of the circular track of the carrier hooks, a slide lock releasable by said catchers including lever means provided with members adapted to engage said carriers proximate the lower ends of said stationary bars and spring means adapted to return said levers and members automatically to locked position in response to the sliding movement of the material carrier being transferred.

2. In a conveyor arrangement provided with material carriers adapted to circulate on catchers having carrier hooks mounted on an endless chain, each of said material carriers having associated therewith a station selecting means operative by way of pivotable release levers to actuate release mechanism on said catchers to automatically release the material carriers and shift them out of circulation, and to automatically transfer said material carriers from a loading station to vacant arriving catchers by way of a slide lock adapted to release individual material carriers; operating means comprising stationary bars for supporting material carriers in alignment and inclined in the direction of the circular track of the carrier hooks, a slide lock releasable by said catchers provided proximate the lower ends of said carrier hooks and adapted to be returned automatically to locked position by the sliding movement of the material carrier being separated, said sliding lock comprising a sliding lock lever for the carriers, a biasing spring retaining said sliding lock lever in actuating position and a release lever disposed in the direction of sliding rearwardly of said sliding lever and having a lug, said sliding lock lever being disposed in the sweep range of said lug, said release lever being associated with a pair of resetting springs and being movable parallel to the pivot axis of said sliding lock lever by means of an unloaded arriving catcher and being adapted to move perpendicularly relative to said sliding lever, said release lever extending further into the sliding path of said material carrier than said sliding lock lever in a manner that a material carrier released by said sliding lock lever engages said release lever and removes said lug from engagement with said sliding lock lever.

References Cited in the file of this patent

UNITED STATES PATENTS

| | | |
|---|---|---|
| 1,781,655 | Cowley | Nov. 11, 1930 |
| 2,667,260 | Pyles | Jan. 26, 1954 |
| 2,849,101 | Austin | Aug. 26, 1958 |
| 2,897,951 | Jonson | Aug. 4, 1959 |